United States Patent [19]

Redman

[11] Patent Number: 4,954,941
[45] Date of Patent: Sep. 4, 1990

[54] METHOD AND APPARATUS FOR PROGRAM UPDATING

[75] Inventor: Brian E. Redman, Chatham, N.J.

[73] Assignee: Bell Communications Research, Inc., Livingston, N.J.

[21] Appl. No.: 238,485

[22] Filed: Aug. 31, 1988

[51] Int. Cl.$^5$ .............................................. G06F 9/44
[52] U.S. Cl. .................................. 364/200; 364/222.82
[58] Field of Search ... 364/200 MS File, 900 MS File

[56] References Cited

U.S. PATENT DOCUMENTS

| | | | |
|---|---|---|---|
| 4,266,271 | 5/1981 | Chamoff et al. | 364/200 |
| 4,403,288 | 9/1983 | Christian et al. | 364/200 |
| 4,459,658 | 7/1984 | Gabbe et al. | 364/200 |
| 4,590,554 | 5/1986 | Glazer et al. | 364/200 |
| 4,685,055 | 8/1987 | Thomas | 364/200 |
| 4,792,918 | 12/1988 | Hirase et al. | 364/200 |

Primary Examiner—Raulfe B. Zache
Attorney, Agent, or Firm—James W. Falk

[57] ABSTRACT

A computer system is disclosed in which individual executing process can be replaced with updated or corrected versions of themselves without interrupting or otherwise interfering with the operation of the computer system. In particular, embedded in the process itself is a command or function or subroutine call which operates to overlay the process code in memory with an updated version of itself, without losing or altering the relationships of the process to the other processes in the computer.

As an example, in a UNIX system, the execute command can be used to perform the replication function. The replication process can be triggered by an interprocess signal, by the occurrance of an external condition, or by a triggering signal embedded in the normal data input to the process.

12 Claims, 3 Drawing Sheets

METHOD AND APPARATUS FOR PROGRAM UPDATING

TECHNICAL FIELD

This invention relates to data processing systems and, more particularly, to the updating of computer programs executing on said systems without interrupting the operation of such systems.

BACKGROUND OF THE INVENTION

Computer programs that control equipment which must be attended to whenever the equipment requires such attention are called real time programs. Such programs include "real time" processes which must be available to be executed at any time that the connected equipment requires. Examples of such real time processes are those processes controlling a telephone switching system, controlling an ongoing manufacturing process, or controlling a moving vehicle. In all of these applications, the computer programs, i.e., the computer software, cannot readily be withdrawn from service for debugging or updating, i.e., software maintenance. The prior art solution to this problem has typically been to provide an entire backup system, hardware and software, so that the backup system can be switched into active use while the system being backed up is taken out of service for software maintenance. The need to duplicate the entire system, and the complexities of switching between the two systems, has made such backup approaches expensive to build and expensive to operate. One such backup arrangement is described in "Life Cycle Support and Update of No. 4 ESS Software," by E. A. Davis and R. J. Healey, 1982 IEEE Document No. 0536-1486/82/0000-0216, page 5G.5.1, 1982. While such expenditures might be justified by the need to provide backups of low reliability hardware, it is well known that the reliability of hardware is very high today, and is improving with each new generation of hardware.

It would therefore be useful to have a program updating system which allows the updating of programmed processes in situ without significantly interfering with the execution of the process.

SUMMARY OF THE INVENTION

In accordance with the illustrative embodiment of the present invention, program updating is accomplished by embedding in the programmed process itself a routine or function or instruction which, when invoked, replicates the process in which it is embedded. The execute command of the UNIX (UNIX is a registered trademark of the American Telephone and Telegraph Company) operating system is one such routine. As described by D. M. Ritchie and K. Thompson in an article entitled "The UNIX Time-Sharing System," *The Bell System Technical Journal*, Vol. 57, No. 6, Part 2, at page 1918, July-August 1978, the execute command requests the operating system to read in and execute a program named in its arguments, using the arguments al. o named in the execute command's arguments. All of the code and data in the process invoking the execute command are replaced, but open files, current directory, and inter-process relationships are unaltered.

It can be seen that the execution of a command, function or subroutine which performs the replication function of the UNIX execute command will replace the code of an executing process while maintaining the internal relationships with (inputs to and outputs from) that process. In accordance with the present invention, this replication function is invoked from the process to be replaced, and executes this selfsame process. In this way, the process to be updated is overlaid with an updated copy of itself without losing any of its inter-process relationships. Since the updating operation is part of the process itself, an interruption of the process is not necessarily required. It is only required that the replacing function be invoked on command.

In accordance with one embodiment of the present invention, the replicating code segment is invoked by a signal which is sent to the executing process. When detected, this signal causes the process to be simultaneously killed (stopping the execution thereof) and to execute a function in the old process which calls for the replication command. This interruption in the execution of the process may result in small errors in the data in the midst of being processed. The replication process itself, however, is very rapid, rendering these errors few and closely localized.

If even small errors in processing cannot be tolerated, the replication command embedded in the executing process can be invoked at some convenient time in the execution of the process, possibly following a logical cycle of execution. Thus, the external asynchronous signal can be used to set a flag which is interrogated at some convenient point during the execution of the process. If the flag has been set by the signal, the replicate function is invoked. If the flag has not been set, another cycle of normal processing takes place.

In accordance with further features of the present invention, the cycles of execution of the process can be interrupted at a convenient time, not only by an inter-process signal, but also by the occurrance of any external condition (hardware or software event), or by a special replicate signal embedded in the normal data stream to the process. Any of these conditions can be used to initiate the replicate function, thereby updating the process at an easily controllable time. Moreover, rather than interrupting execution, these latter arrangements permit the triggering of replication as part of normal data processing without losing or erroneously processing any data whatsoever.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
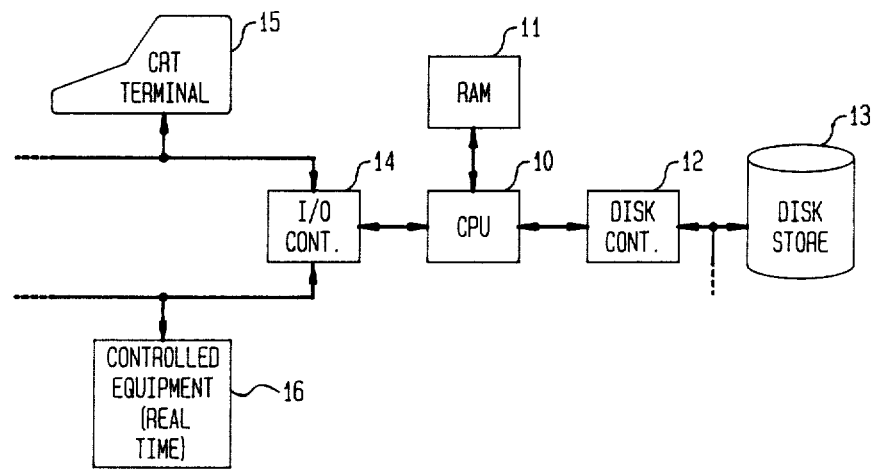
FIG. 1 shows a general block diagram of a computer hardware system in which the present invention might find use.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input and output devices such as CRT (cathode ray tube) terminal 15. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, terminal 15 also provides a mechanism for displaying the results of the operation of the computer system of FIG. 1 for the computer user. Other types of output devices such as line printers, phototypesetters and graphical plotters may also be present.

Input-output controller 14 is also connected to real-time controlled equipment 16 which provides data to CPU 10 and receives control signals from CPU 10. Equipment 16 may, for example, comprise a telephone switching system or a manufacturing production line or process. Such "real-time" equipment, unlike terminal 15, must be responded to whenever data is presented by the equipment 16, and control signals intended for equipment 16 must be delivered to equipment 16 as soon as available from CPU 10. Delays in either accepting data from, or delivering control signals to, equipment 16 may result in a failure which cannot be tolerated in the real time system of which equipment 16 is a part.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
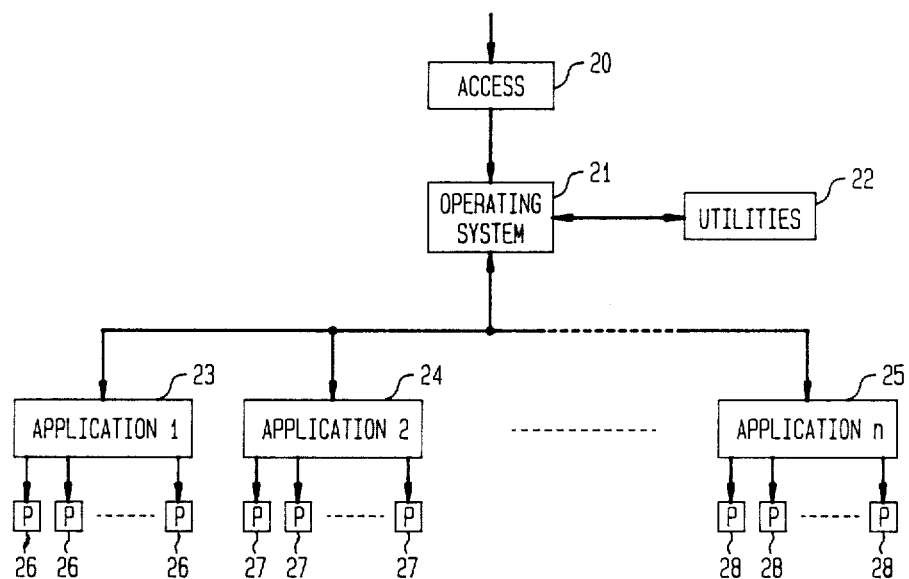
FIG. 2 shows a general block diagram of a computer software system which might be resident on the computer hardware system of FIG. 1 and in which the present invention might find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

The computer software system of FIG. 2 typically also includes a plurality of application programs such as application programs 23, 24, . . . 25. Application programs 23-25 might, for example, comprise an editor, a spreadsheet program, a graphics package, a data base manager, and so forth. Each of the application programs 23 through 25 includes or provides access to a plurality of programmed processes 26, 27, . . . 28, respectively. It is the programmed processes 26 through 28 which actually perform the tasks necessary to carry out the purpose of the corresponding application program. In order to make effective use of these application packages, the user must be able to execute the processes 26–28 at the time, and in the sequence, necessary to accomplish the user's goals.

Figure 3:
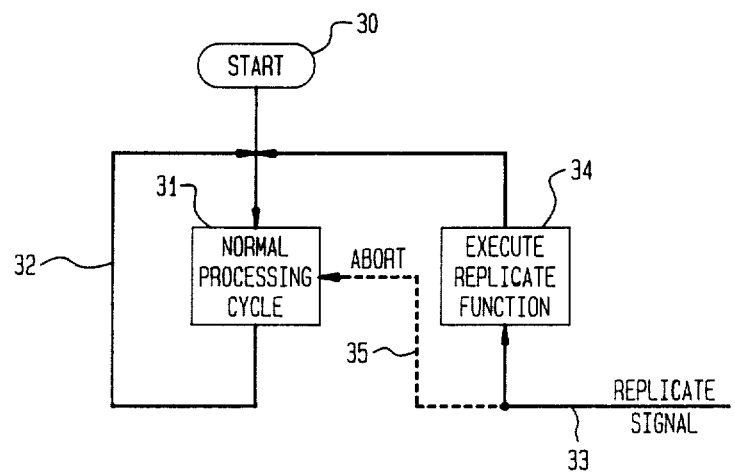
FIG. 3 shows a detailed flowchart of a program updating arrangement in accordance with the present invention in which normal processing is aborted by means of an external signal in order to perform the replication function.

In FIG. 3 there is shown a detailed flowchart of a process in which a self-duplicating function or subroutine is embedded, and which function is enabled by the receipt of a signal initiated in an external process. The signal-initiating process may comprise a user-initiated replication command identifying the particular process to be replaced.

In FIG. 3, the flowchart begins at start box 30 and proceeds to box 31, where a cycle of normal processing takes place. Such normal processing comprises some significant repetitive action undertaken by the process in its normal data processing responsibilities. Following the execution of such normal data processing activities in box 31, box 31 is normally re-entered by way of arrow 32 to continue the normal data processing operations of the process of FIG. 3.

If a replicate signal is received by the process of FIG. 3, indicated symbolically by replicate signal arrow 33 in FIG. 3, box 34 is entered to execute the replicate function. Simultaneously, the normal processing taking place in box 31 is aborted by arrow 35. In this way, the process of FIG. 3 is replicated on command and can be updated by substituting an updated version of the process for the version which had been executing. Such interruption of the executing process may cause some corruption of the data being processed at the instant of interruption, but such small transitory corruptions may be entirely tolerable in the overall application of which the process of FIG. 3 is a part. On the other hand, the reason for replicating the process may be because of serious program errors ("bugs") in the original process. In that case, the processing may already be producing erroneous output, the interruption of which will cause no serious problems in the overall application. It will be appreciated that the new updated copy must be fully compatible with the replaced copy since all of the input processes and all of the output processes have not changed, and are expecting to deliver the same inputs to, and receive the same outputs from, the updated copy as from the replaced copy. A pseudo-code implementation of the flowchart of FIG. 3 can be found as Version 1 in the attached Appendix to the specification.

Figure 4:
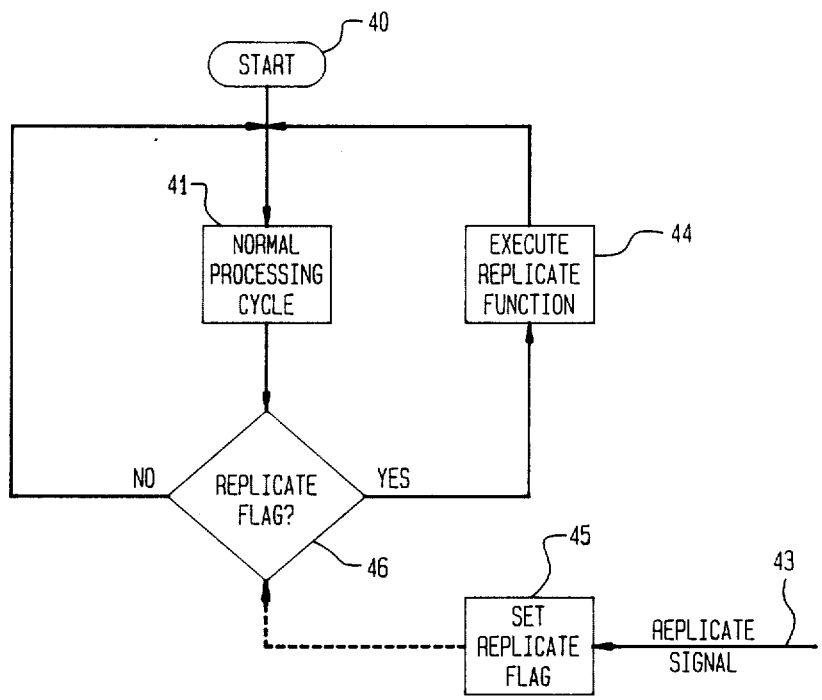
FIG. 4 shows a detailed flowchart of another program updating arrangement in accordance with the present invention in which normal processing is interrupted at some preselected point in the course of processing by means of a flag set by an external signal.

If interruption of the ongoing processing cannot be tolerated in the application of which the process to be replicated is a part, then the "soft interruption" approach of FIG. 4 can be used. In the flowchart of FIG. 4, the process again starts in a start box 40, and proceeds to box 41 where a normal execution cycle takes place. The replicate signal on arrow 43, however, rather than interrupting the normal processing cycle, sets a replicate flag in box 45. Following the normal cycle of execution of the process in box 41, the replicate flag is tested in decision box 46. If the flag has not been set, box 41 is re-entered to continue another normal cycle of execution of the process. If the replicate flag is set, however, decision box 46 detects this flag and causes box 44 to be entered to execute the replicate function. Once the process is replaced by an updated version of itself, normal execution is continued by re-entering box 41.

It will be noted that, in the embodiment of FIG. 4, the executing process is interrupted at a preselected point in its execution, presumably following some normal processing cycle already forming a part of the process. Since this interruption point is selected by the programmer, it can be selected so as to insure no loss or corruption of data which might be caused by asynchronous interruption of processing. The embodiment of FIG. 4 is shown in pseudo-code as Version 2 in the attached Appendix to the specification.

Figure 5:
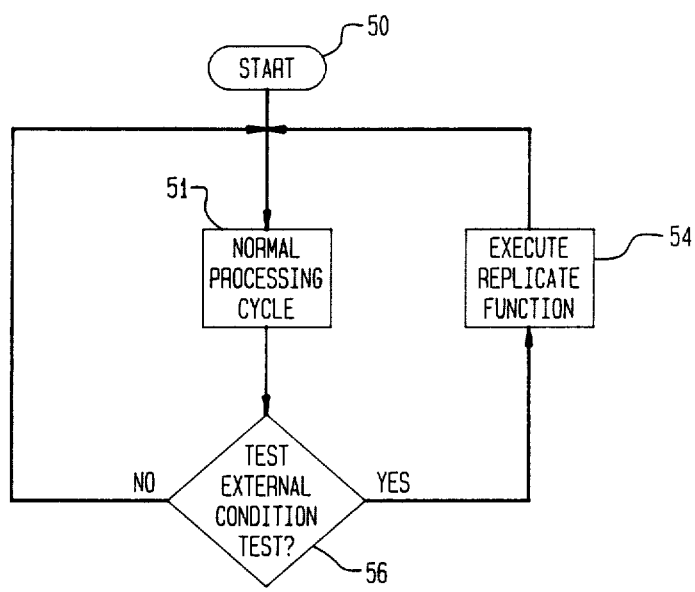
FIG. 5 shows a detailed flowchart of a program updating arrangement in accordance with the present invention in which normal processing is interrupted at some preselected point in the course of processing by means of a test for the occurrance of some external signal.

It will be apparent that a "software interruption" such as that shown in FIG. 4 may be triggered by any other external condition in addition to an interprocess signal. In FIG. 5 there is shown a detailed flowchart of such an embodiment in which the decision box 56 tests for the occurrance of any detectable external condition. Such external conditions may be hardware events (timeouts, faults, key or switch settings, and so forth) or software events (software failures, data corruptions, test failures and so forth). A pseudo-code implementation of the flowchart of FIG. 5 can be found as Version 3 in the attached Appendix to the specification.

It will be noted in connection with FIGS. 3, 4 and 5 that, if and when replacement of the process is in order, it is carried out by following a branch of the original code that is selected in the course of the execution of the original code. For this reason, no data is lost and no processes are interrupted destructively in order to replace the process. Moreover, this replacement takes place just as fast as the hardware is able to overlay the present code with the updated code, after which normal execution of the updated code immediately follows.

The implementation of the present invention illustrated in FIGS. 3, 4 and 5 have the disadvantage of requiring a separate interprocess signalling system or interprocess condition detection system system to be dedicated to triggering the replication function. Not all systems have such an interprocess communication capacity, and the implementation of such a capacity is not a trivial accomplishment. Another version or implementation of the present invention, not requiring any dedicated interprocess communication capacity, is illustrated in FIG. 6.

Figure 6:
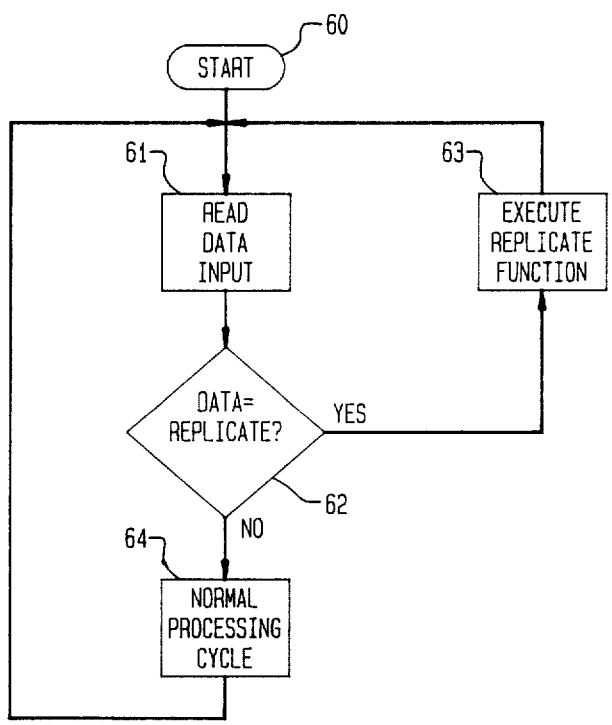
FIG. 6 shows a detailed flowchart of a program updating arrangement in accordance with the present invention in which normal processing is interrupted at some preselected point in the course of processing by means of a test for the appearance of a replicate command in the normal stream of data to the process.

Referring then to FIG. 6, there is shown a detailed flowchart of an illustrative embodiment of the present invention which does not require any dedicated interprocess signalling capability. In general, the implementation of the self-replicating process of FIG. 6 requires that a self-replicating trigger signal by embedded in the normal data input to the process. Since most computer processes operate on data supplied to the process, a means for reading input data is included in virtually all computer processes. Moreover, even if a particular process would not normally include an data reading capacity, the programming code necessary to provide such data reading capability is well known and is available in every computer installation.

Referring more particularly to FIG. 6, there is shown a flowchart comprising a start box 60 which is connected to a data reading box 61. Box 61 provides the normal data reading capability to the process of FIG. 6 and passes the received data to decision box 62. In box 62, it is determined whether or not the data is self-replicating trigger. If not, box 64 is entered to execute the balance of the program, presumably operating in some fashion on the received data. Following the execution of the balance of the program, data reading box 61 is re-entered to await the reception of the next data for processing.

If the data received by box 61 is a self-replication trigger, decision box 62 detects this fact and box 63 is entered to perform the self-replicating function. Thereafter, box 61 is re-entered to continue the process with the updated code. The process shown in the flowchart of FIG. 6 is implemented by the pseudo-code of Version 4 in the attached Appendix.

The correspondence between the pseudo-code versions and the flowcharts of FIGS. 3-6 is obvious and will not be further described here.

It should also be clear to those skilled in the art that further embodiments of the present invention may be made by those skilled in the art without departing from the teachings of the present invention.

APPENDIX

Pseudo-Code for Self-Replication, Version 1 (FIG. 3)

```
main(ARGCOUNT,ARGLIST)
{
        signal(replicate_function);
        .
        .
        /* Balance of main program*/
        .
        .
}
replicate_function()
{
        execute main(ARGCOUNT,ARGLIST);
}
```

Pseudo-Code for Self-Replication, Version 2 (FIG. 4)

```
main(ARGCOUNT,ARGLIST)
{
        signal(set_flag);
        .
```

```
            /* Balance of main program*/
               .
               .
               .
            if(flag = yes)
                {
                    then replicate_function()
                    else continue
                }
            endif;
    }
    replicate_function()
    {
            execute main(ARGCOUNT,ARGLIST);
    }
```

Pseudeo-Code for Self-Replication, Version 3 (FIG. 5)

```
    main(ARGCOUNT,ARGLIST)
    {
            /* Main program cycle*/
               .
               .
               .
            if(condition = yes)
                {
                    then replicate_function()
                    else continue
                }
            endif;
    }
    replicate_function()
    {
            execute main(ARGCOUNT,ARGLIST);
    }
```

Pseudo-Code for Self-Replication, Version 4 (FIG. 6)

```
    main(ARGCOUNT,ARGLIST);
    {
            read(data_input);
            if(data_input means replicate);
                {
                    then replicate_function();
                }
            endif;
               .
               .
               .
            /* Main program cycle*/
               .
               .
    }
    replicate_function()
    {
            execute main(ARGCOUNT,ARGLIST);
    }
```

What is claimed is:

1. A system for updating a programmed process in a computer comprising
   means for replacing the stored object code of a programmed process in the internal memory of a computer without terminating the execution of said process, and
   means for enabling said means for replacing said stored object code from a source outside of said process with updated object code.

2. The updating system according to claim 1 wherein said means for enabling comprises an inter-process signal sent to said programmed process to be updated.

3. The updating system according to claim 2 further comprising
   means responsive to said inter-process signal for interrupting said execution and enabling said replacing means.

4. The updating system according to claim 2 further comprising
   means responsive to said inter-process signal for setting a flag, and
   means responsive to said flag for enabling said replacing means.

5. The updating system according to claim 1 wherein said means for enabling comprises means for detecting a condition external to said programmed process.

6. The updating system according to claim 1 further comprising
   means for supplying a data stream to be processed to said programmed processor,
   said means for enabling comprising a predetermined signal embedded in said data stream.

7. A method for updating a programmed process comprising the steps of
   including in the code for said programmed process a segment of code for replacing all of the code of said programmed process without terminating the execution of said process, and
   triggering the execution of said segment of code when said programmed process is to be updated.

8. The method according to claim 7 wherein said step of triggering comprises the step of
   providing an inter-process message to said programmed process.

9. The method according to claim 8 further including the step of
   aborting the normal execution of said programmed process in response to said inter-process message and immediately initiating said triggering step.

10. The method according to claim 8 further including the step of
    setting a flag in response to said inter-process message and initiating said triggering step at a later time in response to the detection of said flag.

11. The method according to claim 7 wherein said step of triggering comprises the step of
    detecting the occurrance of a condition external to said programmed process.

12. The method according to claim 7 wherei said step of triggering comprises the step of
    embedding a triggering signal in the data normally intended for said programmed process.

* * * * *

UNITED STATES PATENT AND TRADEMARK OFFICE
CERTIFICATE OF CORRECTION

PATENT NO. : 4,954,941

DATED : September 4, 1990

INVENTOR(S) : Brian E. Redman

It is certified that error appears in the above-identified patent and that said Letters Patent is hereby corrected as shown below:

On the Title Page, Item [57],
In the abstract, line 2, "process" should read --processes--.
Column 2, lines 9 and 10, "replacing" should read --replicating--.
Column 5, line 13, "box 40," should read --box, start box 40,--;
        line 38, "software" should read --soft--.
Column 6, line 22, "is self-" should read -- is a self- --.
Column 8, line 57, "wherei" should read --wherein--.

Signed and Sealed this

Thirty-first Day of May, 1994

Attest:

BRUCE LEHMAN

Attesting Officer

Commissioner of Patents and Trademarks